United States Patent [19]

Cliffton et al.

[11] Patent Number: 5,264,176

[45] Date of Patent: Nov. 23, 1993

[54] PRODUCTION OF BIAXIALLY-ORIENTED FILM FROM AROMATIC SULFIDE/KETONE POLYMERS

[75] Inventors: Michael D. Cliffton, Kingsport, Tenn.; Jerry O. Reed, Bartlesville, Okla.; Rex L. Bobsein, Bartlesville, Okla.; Jon F. Geibel, Bartlesville, Okla.

[73] Assignee: Phillips Petroleum Company, Bartlesville, Okla.

[21] Appl. No.: 800,905

[22] Filed: Nov. 26, 1991

Related U.S. Application Data

[62] Division of Ser. No. 527,233, May 22, 1990, Pat. No. 5,089,596.

[51] Int. Cl.$^5$ ............................................. B29C 55/12
[52] U.S. Cl. ........................... 264/235; 264/233; 264/235.8; 264/289.3; 264/290.2; 264/346; 528/222; 528/226
[58] Field of Search .............. 264/235, 235.6, 235.8, 264/331.11, 290.2, 289.3, 233, 346; 528/226, 222

[56] References Cited

U.S. PATENT DOCUMENTS

| | | | |
|---|---|---|---|
| 4,777,228 | 10/1988 | Mizuno et al. | 264/235.8 |
| 4,810,566 | 3/1989 | Kawakami et al. | 264/235.6 |
| 4,897,238 | 1/1990 | Kouyama et al. | 264/290.2 |
| 4,980,114 | 12/1990 | Satake et al. | 264/290.2 |
| 5,003,033 | 3/1991 | Geibel et al. | 528/226 |
| 5,045,628 | 9/1991 | Nesheiwat | 528/388 |
| 5,071,944 | 12/1991 | Cliffton et al. | 528/226 |
| 5,085,819 | 2/1992 | Satake et al. | 264/235 |

FOREIGN PATENT DOCUMENTS 58-208019 12/1983 Japan ................. 264/235.8

*Primary Examiner*—Jeffery Thurlow
*Attorney, Agent, or Firm*—Beverly M. Dollar

[57] ABSTRACT

An aromatic sulfide/ketone polymer is prepared from a dihaloaromatic ketone, alkali metal sulfide, water and a polar organic compound. The polymerization reaction mixture is subjected to a heat soak at an elevated temperature, then a separation agent is added under controlled conditions and the mixture is subsequently cooled to provide a mixture comprising particulate aromatic sulfide/ketone polymer. Biaxially-oriented film is made from the recovered particles of aromatic sulfide/ketone polymer by (1) washing the polymer particles with an aqueous calcium salt, (2) heating the washed particles to remove water, (3) molding the heated particles to form a sheet of polymer, (4) biaxially stretching the sheet above the glass transition temperature of the polymer to form a film, and (5) heat-setting the biaxially-oriented film under stretching tension for a time and at a temperature to increase strength properties and density.

3 Claims, No Drawings

PRODUCTION OF BIAXIALLY-ORIENTED FILM FROM AROMATIC SULFIDE/KETONE POLYMERS

This application is a division of application Ser. No. 07/527,233, filed May 22, 1990, now U.S. Pat. No. 5,089,596.

This invention relates to the production of aromatic sulfide/ketone polymers. In another aspect this invention relates to the production of aromatic sulfide/ketone polymers of high molecular weight and good melt stability. In a further aspect, this invention relates to the production of biaxially-oriented film from aromatic sulfide/ketone polymers produced according to the method of the invention.

BACKGROUND OF THE INVENTION

Thermoplastic synthetic polymers are well-known for the desirable characteristics of moldability and processing with techniques which are especially suited for the mass production of various articles from such polymers. However, many thermoplastic polymers by their very nature are often not useable in applications requiring relatively high use temperatures. In recent years various thermoplastic polymers have been developed which can be employed at relatively high temperatures and under corrosive conditions. Such thermoplastic polymers generally have a relatively high melting or softening point that provides the enhanced high temperature resistance of articles prepared therefrom.

A continuing problem remains, however, in that the molecular weight and melt stability of such heat resistant thermoplastic polymers is often inadequate to maintain a good balance of physical properties in the final article produced from the polymer. In particular, when it is desired to make biaxially-oriented film from such polymers, it is necessary that the molecular weight and the stability of the thermoplastic polymer be adequate for the production of useful biaxially-oriented film having good physical properties. Thus, methods of producing such thermoplastic heat-resistant polymers of suitable molecular weight and stability for the production of biaxially-oriented films are still being sought.

Aromatic sulfide/ketone polymers are known in the art as having high crystalline melting points and are thus desired in applications requiring a high use temperature. Such applications include, for example, coatings for electrical wiring, automotive parts, aircraft parts, and the like. Biaxially-oriented film obtained from aromatic sulfide/ketone polymers is especially useful in applications such as electrical insulation and the like.

It is an object of our invention to provide a process for producing aromatic sulfide/ketone polymers. It is a further object of our invention to provide a process for producing aromatic sulfide/ketone polymers of high molecular weight and good melt stability. It is a still further object of our invention to provide a simple and readily controllable process for producing aromatic sulfide/ketone polymers of high molecular weight and good melt stability. It is also an object of our invention to provide a process for producing biaxially-oriented film from aromatic sulfide/ketone polymers of high molecular weight and good melt stability which are made by our inventive process.

BRIEF STATEMENT OF THE INVENTION

According to our invention a process is provided for the production of an aromatic sulfide/ketone polymer comprising the steps of:

(a) contacting at least one polar organic compound, at least one dihaloaromatic ketone, at least one alkali metal sulfide, and water under polymerization conditions effective for producing a first polymerization reaction mixture;

(b) heating said first polymerization reaction mixture to an elevated temperature of about 280° C. to about 350° C. and maintaining said first polymerization reaction mixture at said elevated temperature for about 10 seconds to about 1 hour thereby producing a second polymerization reaction mixture;

(c) adding at least one separation agent to said second polymerization reaction mixture wherein the amount of separation agent added is about 50 to about 500 mL per g-mole of dihaloaromatic ketone utilized in step (a); wherein said at least one separation agent is added at a rate of about 10 to about 150 mL/minute per g-mole of dihaloaromatic ketone utilized in step (a);

(d) cooling the mixture obtained from step (c) to a temperature below the polymer solidification temperature thereby producing a mixture comprising particles of said aromatic sulfide/ketone polymer.

Our invention further provides a process for preparing biaxially-oriented film from said aromatic sulfide/ketone polymers made according to the process described above which further comprises the steps of:

(e) recovering said particles of aromatic sulfide/ketone polymer;

(f) washing said recovered particles of aromatic sulfide/ketone polymer with an aqueous mixture comprising at least one calcium salt;

(g) heating said washed particles of aromatic sulfide/ketone polymer at about 190° C. to about 235° C. to remove substantially all water, wherein the resulting heated particles are at least partially crystalline;

(h) molding said heated particles of aromatic sulfide/ketone polymer under conditions effective for producing a sheet of polymer;

(i) biaxially stretching said sheet of polymer at a temperature above the glass transition temperature of said aromatic sulfide/ketone polymer and at a draw ratio of about 2.5 to about 6 to form a biaxially-oriented film of said aromatic sulfide/ketone polymer;

(j) heating said biaxially-oriented film under stretching tension of step (i) at a temperature of about 175° C. to about 325° C. for a time of about 10 seconds to about 3 hours.

Our invention thus provides a simple straightforward method for producing aromatic sulfide/ketone polymer of high molecular weight and good melt stability having consistent quality that enables the production of biaxially-oriented film in the manner described.

DETAILED DESCRIPTION OF THE INVENTION

Preferred dihaloaromatic ketones that can be employed in the process of our invention can be represented by the formula:

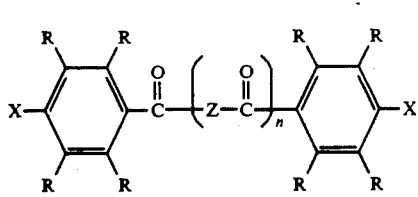

where each X is selected from the group consisting of fluorine, chlorine, bromine, and iodine; Z is a divalent radical selected from the group consisting of:

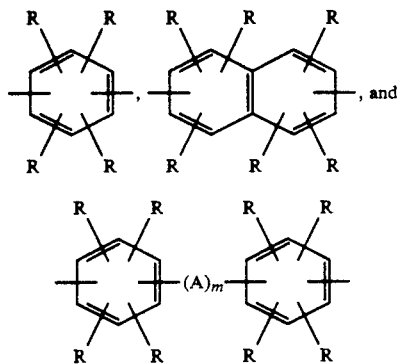

and n is 0 or 1; m is 0 or 1; A is selected from the group consisting of oxygen, sulfur, sulfonyl, and $CR_2$; and each R is selected from the group consisting of hydrogen and alkyl radicals having 1 to about 4 carbon atoms, the total number of carbon atoms in all of the R groups in the molecule being 0 to about 12.

Our process more preferably employs a dihalobenzophonone of the formula:

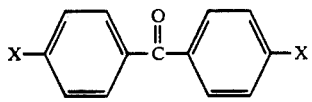

wherein X is defined as above.

Examples of suitable dihaloaromatic ketones which can be employed in the process of our invention include: 4,4'-dichlorobenzophenone, 4,4'-difluorobenzophenone, 4,4'-dibromobenzophenone, 4,4'-diiodobenzophenone, 4-chloro-4'-fluorobenzophenone, 1,4-bis-(4-fluorobenzoyl)benzene, 1,4-bis-(4-chlorobenzoyl)benzene, 1-(4-chlorobenzoyl)-4-(4-fluorobenzoyl)benzene, bis[4-(4-chlorobenzoyl)phenyl]thioether, bis(2,3,5,6-tetramethyl-4-chlorophenyl)ketone, bis[4-(4-chlorobenzoyl)phenyl]ether, 4,4'-bis-(4-chlorobenzoyl)biphenyl, and the like, and mixtures of any two or more thereof.

The presently preferred dihaloaromatic ketone is 4,4'-dichlorobenzophenonone because of its effectiveness and commercial availability.

In our invention the amount of dihaloaromatic ketone employed depends upon the amount of alkali metal sulfide employed but generally these compounds will both be present in about equal molar proportions. The preferred molar ration of dihaloaromatic ketone to the alkali metal sulfide is about 0.95:1 to about 1.05:1.

The polar organic compounds which can be used in the method of our invention for the production of aromatic sulfide/ketones includes amides and sulfones. Examples include hexamethylphosphoramide, tetramethylurea, N,N'-ethylenedipyrrolidone, 1,3-dimethyl-2-imidazolidinone, N-methyl-2-pyrrolidone (NMP), pyrrolidone, caprolactam, N-methylcaprolactam, N-ethylcaprolactam, sulfolane, N,N'-dimethylacetamide, diphenylsulfone, and the like, and mixtures thereof. The preferred polar organic compound because of its effectiveness and commercial availability is NMP.

The molar ratio of polar organic compound to alkali metal sulfide used in our invention is generally about 4:1 to about 36:1, preferably about 8:1 to about 24:1.

The alkali metal sulfides that can be employed according to our invention include lithium sulfide, sodium sulfide, potassium sulfide, rubidium sulfide, cesium sulfide, and mixtures thereof.

If desired, the alkali metal sulfide can be prepared by the reaction of hydrogen sulfide with about twice the molar amount of an alkali metal hydroxide. The alkali metal sulfide can also be prepared by contacting an alkali metal hydrosulfide with a base such as an alkali metal hydroxide or carbonate generally conducted in an aqueous medium. Suitable alkali metal hydroxides or carbonates that can be employed to prepare the alkali metal sulfides according to these embodiments include lithium hydroxide, sodium hydroxide, potassium hydroxide, rubidium hydroxide, cesium hydroxide, lithium carbonate, sodium carbonate, potassium carbonate, rubidium carbonate, cesium carbonate, and mixtures thereof. Suitable alkali metal hydrosulfides include lithium hydrosulfide, sodium hydrosulfide, potassium hydrosulfide, rubidium hydrosulfide, cesium hydrosulfide and mixtures thereof.

That amount of water employed in the polymerization process of our invention is such that the molar ratio of water to alkali metal sulfide is about 3:1 to about 7:1, preferably about 4:1 to about 6:1.

The charge sequence of the various compounds employed in the polymerization process of our invention can be varied as desired. One convenient method is to simply charge all the compounds in any desired sequence to a suitable reaction vessel equipped with agitation means at about room temperature and then to heat the mixture with stirring to the desired polymerization reaction temperature. It is also possible to preheat the mixture of only certain of the compounds in a separate vessel then to charge this mixture to a preheated mixture of the remainder of the compounds in the reaction vessel.

The reaction temperature at which the polymerization of our invention can be conducted can vary over a wide range. However, it will generally be within the range of about 175° C. to about 350° C., preferably about 225° C. to about 300° C. The reaction time can also vary widely depending in part on the reaction temperature employed but generally it will be within the range of about 10 minutes to about 72 hours, preferably about 1 hour to about 20 hours. The pressure employed should be sufficient to maintain the polymerization reaction mixture substantially in the liquid phase. The autogenous pressure will generally be in the range of about 0 psig to about 1500 psig, preferably about 150 psig to about 250 psig.

According to our invention, high molecular weight melt-stable aromatic sulfide/ketone polymer is produced by utilizing the following sequence of steps in the polymerization process. Thus, at the end of an initial reaction step the temperature is maintained at about 280° C. to about 350° C., preferably about 300° C. to about 310° C. and the mixture held at this elevated temperature for a period of time which is about 10 seconds to about 1 hour, preferably about 1 minute to about 30 minutes. This step can be denoted as a heat soak step in our process.

Next, the polymerization reaction mixture, which is at the elevated temperature for a relatively short period of time, is then treated with a suitable separation agent which is defined as a non-solvent for the aromatic sulfide/ketone polymer. Said separation agent is added in a controlled manner as described hereinafter. The amount of separation agent added in the separation step can range from about 50 mL to about 500 mL, preferably about 200 mL to about 300 mL per g-mole of dihaloaromatic ketone employed in the polymerization reaction charge. The rate of addition of the separation agent is about 10 to about 150 mL/minute, preferably about 30 to about 75 mL/minute per g-mol of dihaloaromatic ketone employed in the polymerization reaction charge.

Suitable separation agents that can be employed in the process of our invention include water, alcohols, ethers, and hydrocarbons. Aliphatic alcohols having 1 to about 8 carbon atoms per molecule, aliphatic ethers having 2 to about 8 carbon atoms per molecule, polyethers having 3 to about 30 carbon atoms per molecule and hydrocarbons having about 4 to about 12 carbon atoms per molecule can be employed as separation agents. Examples of suitable separation agents include water, methanol, ethanol, n-butanol, diethyl ether, dibutyl ether, tetraglyme, hexane, octane, and the like and mixtures thereof. Water is presently preferred as a separation agent in the process of our invention.

The polymerization reaction mixture which has undergone the heat soak and controlled separation steps according to our invention is then cooled to a temperature below the polymer solidification temperature and the resulting particulate aromatic sulfide/ketone polymer separated from this mixture such as by filtration. The recovered polymer is generally washed with water at least once and preferably several times with at least a portion of the washing being conducted at elevated temperatures. It is preferred that the recovered polymer be washed in the presence of an aqueous mixture of a calcium salt, e.g. calcium acetate, prior to a final washing with water. Optionally, the recovered particulate polymer can be washed with an aqueous solution of an alkali metal hydroxide prior to the washing of the polymer with the aqueous mixture of a calcium salt.

Aromatic sulfide/ketone polymers prepared as described above according to our invention can be employed further according to our invention in the preparation of biaxially-oriented films. Said polymers will generally be characterized by a melt flow of about 10 to about 200 grams/10 minutes as determined according to ASTM D 1238-79 Procedure B-Automatically Timed Flow Rate Measurement under Condition 371/5.0 modified to employ a 5 minute preheat time. Preferably, the melt flow will be about 40 to about 120 grams/10 minutes for the aromatic sulfide/ketone polymers utilized in our invention.

BIAXIALLY-ORIENTED FILM FORMATION

According to our invention the high molecular weight melt-stable aromatic sulfide/ketone polymer prepared as described above is utilized in the formation of biaxially-oriented film as described hereinafter.

Generally, the particulate aromatic sulfide/ketone polymer is formed into pellets by conventional techniques for convenience in subsequent handling. However, the particulate aromatic sulfide/ketone polymer can be employed according to our invention without passing through a pelletizing step.

In any case, the aromatic sulfide/ketone polymer particles are heated at a temperature of about 190° C. to about 235° C. for a time sufficient to remove substantially all of the water that may be absorbed on the polymer. Such a drying or heating step may also serve to induce at least some crystallization in the polymer and in the case of pellets is usually observable by a color change in which the polymer typically changes from an amber to a gray color.

The aromatic sulfide/ketone polymer which has been subjected to the above-described heating step is then charged to conventional apparatus suitable for molding or extruding the polymer at about 330° C. to about 450° C., preferably about 350° C. to about 380° C. into a sheet of polymer.

As used in the specification and claims herein, the term sheet is used to denote a form of the polymer which is solid, relatively broad, and having a thickness equal to or greater than 0.13 mm. On the other hand, the term film, as used in the specification and claims herein, is used to denote a form of the polymer which has substantially the same general shape as a sheet of polymer but which has a thickness of less than 0.13 mm.

The sheet of polymer is then subjected to a biaxially-stretching operation at a temperature above the glass transition temperature of the aromatic sulfide/ketone polymer, typically at about 150° C. to about 180° C., and at a draw ratio of about 2.5 to about 6 to produce a biaxially-oriented film of the aromatic sulfide/ketone polymer. The biaxially-oriented film thickness will depend on the thickness of the starting sheet and the draw ratio used. Generally, the film thickness will be about 0.01 to about 0.12 mm.

The biaxially-oriented film while still under stretching tension of the biaxial-stretching step is then subjected to a heat-setting or annealing step at a temperature of about 175° C. to about 325° C., preferably about 250° C. to about 320° C. The heat-setting or annealing operation on the stretched film can conveniently be conducted in a forced air oven through which the stretched film is passed in a continuous or non-continuous manner.

The aromatic sulfide/ketone polymer film produced according to our invention can be employed in a variety of important applications because of its excellent high temperature resistance and mechanical properties. Typical applications in which the film can be employed include electric insulation, capacitors, flexible circuit boards, packaging, wallcovering for rooms and equipment, magnetic recording tape base, acoustic membrane, photographic film and the like.

EXAMPLES

Examples are provided in an effort to assist one skilled in the art to a further understanding of the invention, and yet not be unduly limitative of the reasonable scope of our invention. The particular reactants, conditions, ratios, and the like, are all intended to be illustrative of our invention, and not limitative of the reasonable and suitable scope thereof.

In the following examples, melt flow (MF) values were determined by the method of ASTM D 1238-79, Procedure B-Automatically Timed Flow Rate Measurement under Condition 371/5.0 modified to employ a 5-minute preheat time. When longer preheat times were used to obtain an indication of the stability of the polymer in the melt, the preheat time is noted.

Film densities were determined using a gradient density column. Film physical properties were determined on an Instron tensile tester.

EXAMPLE I

This is an example describing poly(phenylene sulfide/ketone) PPSK polymers prepared by a procedure without a heat soak step.

An autoclave was charged with 2.0 g-mole of sodium hydrosulfide (NaSH), 2.0 g-mole of sodium hydroxide (NaOH), 2.0 g-mole of 4,4'-dichlorobenzophenone (DCBP), 6.0 g-mole of deionized water, and 24.84 g-mole N-methyl-2-pyrrolidone (NMP). In this and all subsequent polymerizations, the NaSH was added as a mixture of NaSH and water containing about 59 weight percent NaSH. The autoclave was sealed and purged six times with nitrogen. After the autoclave agitator was started, and adjusted to 250 rpm, the temperature was increased to 250° C. and held for three hours. At the completion of the three hour hold, the agitator speed was increased to 500 rpm and the autoclave was heated to 300° C. When the temperature reached 300° C., the heat was turned off and 475 mL of deionized water added slowly. The reactor was cooled and the crude polymer was removed from the reactor.

After the polymer had been filtered on a 150 mesh screen, the polymer was washed three times with hot (80°-90° C.), deionized water. The wet polymer was charged to an autoclave with 30 g NaOH and 3000 mL deionized water, stirring initiated, purged with nitrogen, heated to 125° C., and then cooled. The filtered polymer was charged to an autoclave with 150 g calcium acetate and 3000 mL deionized water and stirring initiated. After the mixture had been purged with nitrogen, the autoclave was heated to 185° C., held for 30 minutes, and cooled. The autoclave contents were filtered, washed with deionized water, and dried at 118° C. in a forced air oven for 18 hours. Several other polymers were prepared in a similar manner and combined to form Polymer 1.

Several more polymer samples were prepared in a manner similar to that described above and were combined to form Polymer 2.

EXAMPLE II

This example demonstrates the preparation of PPSK polymers using a heat soak step.

An autoclave was charged with 2.0 g-mole NaSH, 2.01 g-mole NaOH, 2.01 g-mole 4,4'-dichlorobenzophenone, 6.0 g-mole deionized water, and 24.84 g-mole NMP. The autoclave was sealed, purged with nitrogen, stirred at 250 rpm, and heated to 250° C. The mixture was held at 250° C. for three hours and then heated to 300° C., the agitator speed was increased to 500 rpm, and the temperature was maintained at 300° C. and about 400 psig pressure for 15 minutes. The autoclave heater was turned off and 475 mL of deionized water charged at a rate of 79 mL/min. to the autoclave. After the autoclave had cooled, the crude polymer was removed and filtered. The polymer was washed four times with hot (80°-90° C.) deionized water.

The polymer was treated with aqueous NaOH followed by filtration and treatment with aqueous calcium acetate as described in Example I. After the polymer had been filtered and washed with ambient temperature deionized water, it was dried in a forced air oven at 110° C. to yield Polymer 3.

Several more PPSK samples were prepared in a manner similar to that described for Polymer 3 except for the levels of NaSH and DCBP, the heat soak conditions, and the separation water addition rate. These are listed in Table I.

TABLE I

| | PPSK Polymerizations | | | | |
|---|---|---|---|---|---|
| Polymer | NaOH, g-mol | DCBP[a] g-mol | Heat Soak Conditions | | Separation Water Addition, mL/min |
| | | | Temp °C. | Time, min. | |
| 4 | 2.015 | 2.015 | 310 | 5 | 119 |
| 5 | 2.01 | 2.010 | 300 | 15 | 69 |
| 6 | 2.01 | 2.010 | 300 | 15 | 95 |
| 7 | 2.005 | 2.005 | 300 | 15 | 95 |

[a]4,4'-Dichlorobenzophenone
The melt flow values of Polymers 1 through 7 at 5 minute and some longer preheat times were determined and are shown in Table II. The MF values of Polymers 1 and 2 show a rapid increase in viscosity (decrease in MF) at longer preheat times. Polymers 4 and 5 have a slower decrease in MF at longer preheat times indicating better melt stability than Polymers 1 and 2.

TABLE II

| | PPSK Polymers | | |
|---|---|---|---|
| | Melt Flow (g/10 min) with Preheat time of | | |
| Polymer | 5 min | 10 min | 15 min |
| 1 (control) | 104 | 59 | 22 |
| 2 (control) | 34 | 10 | a) |
| 3 | 270 | a) | a) |
| 4 | 95 | 75 | 40 |
| 5 | 82 | 46 | 31 |
| 6 | 59 | a) | a) |
| 7 | 44 | a) | a) | a) Not determined

EXAMPLE III

This example describes the conversion of PPSK to biaxially oriented films and demonstrates the advantage found for polymers of the present invention for biaxial orientation.

Polymers 3 through 7 were melt extruded and pelletized on a 19 mm diameter NRM extruder fitted with 40/80/120/40 mesh screens in the breaker plate. All polymers had been dried in a vacuum oven at 110° C. for 16 hours before pelletizing. The melt temperatures during the extrusion were between 346° C. and 352° C.

Polymer 1 was melted, solidified, and ground in a Wiley Mill to produce ground particles for molding. The particles were dried for 18 hours in a vacuum oven at 150° C. Compression molding was carried out using the dried particles and a picture frame mold having a 152×152 mm opening and a thickness of 0.406 mm. The molding conditions were at a press temperature of 360° C. and 3 minutes of zero pressure preheat followed by 1 minute with 20,000 pounds ram force. The hot mold and plates were quenched immediately after release of the pressure into a mixture of ice and water. Attempts to biaxially orient the PPSK sheet in a T. M. Long film stretcher (T. M. Long Co., Inc., Somerville, N.J.) at 154° C. resulted in a maximum draw ratio of only 2.5×.

Samples of pellets made from Polymers 3 to 7 were dried at 150° C. for 2 hours in a forced air oven. Samples molded from these dried pellets using conditions described above contained large amounts of bubbles and were judged unsuitable for orientation. Additional samples of pellets were dried at 180° C. in a vacuum oven for 18 hours and molded samples contained many bubbles. From the pellet color, some of the dried pellets had obviously not crystallized. Another set of samples dried at 200° C. for 30 minutes in a forced air oven were molded as described above. These molded sheet samples were greatly improved in quality over earlier samples. Further drying evaluations at 225° C. for 30 minutes in forced air oven also gave improved molded sheet samples. These results indicate that PPSK sheet formation is improved by the use of higher temperatures for the pellet drying.

Another sample of particles from Polymer 1 was dried at 225° C. for 30 minutes in a forced air oven and compression molded at 360° C. using conditions described above. The quenched sheet was biaxially oriented on a T. M. Long film stretcher and the maximum draw ratio obtained was 2.5×.

From examination of molded samples, it was apparent that sheet from Polymer 3 was not of a quality suitable for biaxial orientation. Apparently, this relatively high melt flow polymer is too low in molecular weight to be suitable for acceptable sheet formation and orientation. Biaxial orientation on a T. M. Long film stretcher of molded sheet from Polymers 5, 6, and 7 at 154° C. with a preheat time of 20 seconds was successful and draw ratios of 3.0 to 3.5× in both directions were obtained.

Additional samples of pellets from Polymers 6 and 7 were dried at 200° C. for 1 hour in a forced air oven. The dried pellets were compression molded at 360° C. using a 90 second preheat at zero pressure and 1 minute at 20,000 pounds ram force followed by quenching in an ice-water bath. These sheet samples (about 0.38 mm thick) were biaxially oriented on a T. M. Long film stretcher at 154° using a 30 second preheat. The oriented films samples were about 0.03 to 0.04 mm thick. Some oriented film samples were heatset with the edges held in metal frames to prevent shrinkage at 300° C. for 120 seconds. Film properties for both heatset and non-heatset samples are shown in Table III. Increases in density and tensile strength were observed as a result of the heatset step.

TABLE III

| Biaxially Oriented PPSK Film | | | | | | |
|---|---|---|---|---|---|---|
| Polymer | Draw Ratio | Heatset[a] | Density, g/cc | Tensile Yield, MPa | Tensile Strength, MPa | Elongation, % |
| 6 | 3.25 | no | 1.316 | 92 | 140 | 61 |
| 7 | 3.25 | no | 1.321 | 94 | 157 | 72 |
| 6 | 3.25 | yes | 1.349 | 109 | 177 | 41 |
| 7 | 3.25 | yes | 1.354 | 120 | 202 | 44 |

[a]Heatset at 300° C. for 120 seconds.

That which is claimed is:

1. A process for preparing biaxially-oriented film from particles of aromatic sulfide/ketone polymers comprising the steps of:

washing said particles of aromatic sulfide/ketone polymer with an aqueous mixture comprising at least one calcium salt;

heating said washed particles at about 190° to about 235° C. to remove substantially all water;

molding said heated particles under conditions effective for producing a sheet of polymer;

biaxially stretching said sheet of polymer at a temperature above the glass transition temperature of said aromatic sulfide/ketone polymer and at a draw ratio of about 2.5 to about 6 to form a biaxially-oriented film of said aromatic sulfide/ketone polymer; and heating said biaxially-oriented film under stretching tension of the previous step at a temperature of about 175° C. to about 325° C. for a time of about 10 seconds to about 3 hours, wherein said particles of aromatic sulfide/ketone polymer are made by a method comprising the steps of charging to a polymerization reaction vessel, and thereby contacting at least one polar organic compound, at least one dihaloaromatic ketone of the formula

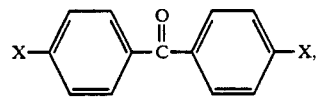

wherein each X is selected from the group consisting of fluorine, chlorine, bromine, and iodine, at least one alkali metal sulfide, and water under polymerization conditions effective for producing a first polymerization reaction mixture;

heating said first polymerization reaction mixture to an elevated temperature of about 280° to about 350° C. and maintaining said first polymerization reaction mixture at said elevation temperature for about 10 seconds to about 1 hour thereby producing a second polymerization reaction mixture;

adding at least one separation agent to said second polymerization reaction mixture wherein the amount of separation agent added is about 50 to about 500 mL per g-mole of said dihaloaromatic ketone charged; wherein said at least one separation agent is added at a rate of about 10 to about 150 mL/minute per g-mole of said dihaloaromatic ketone charged;

cooling to a temperature below the polymer solidification temperature thereby producing a mixture comprising particles of said aromatic sulfide/ketone polymer and recovering said particles of aromatic sulfide/ketone polymer employed to prepare said biaxially-oriented film.

2. A process according to claim 1 wherein said polar organic compound employed in the preparation of said aromatic sulfide/ketone polymer is selected from the group consisting of N-methyl-2-pyrrolidone, 1,3 dimethyl-2-imidazolidinone, N-ethyl caprolactam, N-methyl-caprolactam, sulfolane and diphenylsulfone.

3. A process according to claim 1 wherein said alkali metal sulfide is sodium sulfide; said dihaloaromatic ketone is 4,4'-dichlorobenzophenone; said polar organic compound is N-methyl-2-pyrrolidone; and wherein separation agent is water.

* * * * *